US009830541B2

(12) United States Patent
Sanuki

(10) Patent No.: US 9,830,541 B2
(45) Date of Patent: Nov. 28, 2017

(54) IMAGE OUTPUT SYSTEM, IMAGE OUTPUT METHOD, DOCUMENT SERVER, AND NON-TRANSITORY COMPUTER READABLE RECORDING MEDIUM

(71) Applicant: Konica Minolta, Inc., Tokyo (JP)

(72) Inventor: Yusuke Sanuki, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/685,137

(22) Filed: Apr. 13, 2015

(65) Prior Publication Data

US 2015/0294203 A1 Oct. 15, 2015

(30) Foreign Application Priority Data

Apr. 14, 2014 (JP) .................................. 2014-082471

(51) Int. Cl.
*G06F 3/12* (2006.01)
*G06K 15/00* (2006.01)
(Continued)

(52) U.S. Cl.
CPC ....... *G06K 15/1868* (2013.01); *G06F 3/1206* (2013.01); *G06F 3/1243* (2013.01);
(Continued)

(58) Field of Classification Search
CPC .... G06F 3/1206; G06F 3/1211; G06F 3/1228; G06F 3/1243; G06F 3/1245;
(Continued)

(56) References Cited

U.S. PATENT DOCUMENTS

| 5,923,013 | A | * | 7/1999 | Suzuki | G06F 3/1205 |
| | | | | | 235/375 |
| 2003/0135549 | A1 | * | 7/2003 | Kuno | G06F 3/1204 |
| | | | | | 709/203 |

(Continued)

FOREIGN PATENT DOCUMENTS

| JP | H09-325867 A | 12/1997 |
| JP | 2007-004247 A | 1/2007 |
| JP | 2008-269157 A | 11/2008 |

OTHER PUBLICATIONS

Extended European Search Report issued in corresponding European Application No. 15163332.8 dated Sep. 10, 2015 (7 pages).

(Continued)

*Primary Examiner* — Chad Dickerson
(74) *Attorney, Agent, or Firm* — Osha Liang LLP

(57) ABSTRACT

An image output system includes a document server, an information processing terminal, and an image output device connected in a network. The information processing terminal designates an output target document out of documents stored in the document server and instructs output of a job to the image output device. If the image output device is not a direct output compatible device that outputs a file format of the output target document, the document server converts the output target document to image data in a given file format, generates job data, and transmits the job data to the image output device. The job data including job control information that defines output setting and job substantive information designating the image data as the output target in a page description language.

21 Claims, 10 Drawing Sheets

(51) Int. Cl.
*G06K 15/02* (2006.01)
*H04L 29/08* (2006.01)
*H04N 1/00* (2006.01)
*H04N 9/64* (2006.01)

(52) U.S. Cl.
CPC .......... *G06F 3/1245* (2013.01); *G06F 3/1288* (2013.01); *G06K 15/181* (2013.01); *G06K 15/1825* (2013.01); *H04L 67/10* (2013.01); *H04N 1/00222* (2013.01); *H04N 1/00244* (2013.01); *G06F 3/1228* (2013.01); *H04N 2201/0065* (2013.01)

(58) Field of Classification Search
CPC .... G06F 3/1254; G06F 3/1276; G06F 3/1288; G06F 3/129; G06K 15/181; G06K 15/1825; G06K 15/1868; H04L 67/10; H04N 1/00; H04N 1/00222; H04N 1/00244; H04N 7/12; H04N 7/015; G09G 5/006
USPC .... 358/1.11–1.18, 1.1, 1.9, 2.1, 1.2; 348/38, 348/218.1, 245, 246
See application file for complete search history.

(56) References Cited

U.S. PATENT DOCUMENTS

| | | | |
|---|---|---|---|
| 2004/0172586 A1* | 9/2004 | Ragnet | G06F 17/30011 715/255 |
| 2007/0091120 A1* | 4/2007 | Oura | G09G 5/006 345/629 |
| 2008/0158581 A1* | 7/2008 | Ferlitsch | G06F 3/1206 358/1.13 |
| 2008/0263071 A1* | 10/2008 | Ferlitsch | G06F 3/1204 |
| 2010/0195142 A1 | 8/2010 | Watanabe | |
| 2010/0245885 A1* | 9/2010 | Selvaraj | G06F 3/1205 358/1.15 |
| 2012/0069366 A1* | 3/2012 | Heffner | G06F 3/1204 358/1.13 |
| 2012/0170060 A1* | 7/2012 | Nordback | G06F 3/1212 358/1.2 |
| 2012/0229833 A1* | 9/2012 | Nakagawa | H04N 1/0097 358/1.13 |

OTHER PUBLICATIONS

Office Action issued in corresponding Chinese Application No. 201510167328.7 dated Jul. 13, 2017 (18 pages).

* cited by examiner

IMAGE OUTPUT SYSTEM, IMAGE OUTPUT METHOD, DOCUMENT SERVER, AND NON-TRANSITORY COMPUTER READABLE RECORDING MEDIUM

CROSS-REFERENCE TO RELATED APPLICATION

The present application claims priority to Japanese Patent Application No. 2014-082471. The content of the priority application is hereby incorporated by reference in its entirety.

BACKGROUND

Field of the Disclosure

The present disclosure relates to an image output system, an image output method, a document server, and a non-transitory computer readable recording medium. More specifically, the present disclosure relates to a technique of generating a job employed when the document server outputs a job to an image output device.

Background

In order to print a document file typically in a PDF (portable document format) using a computer, a user gives a print instruction to an application enabling browsing or editing of the document file. This starts a printer driver to generate job data. Specifically, the application outputs data for printing based on the document file to the printer driver through a GDI (graphics device interface) provided by an operating system. Then, the printer driver converts the data for printing to a page description language such as PS (PostScript) or PCL (printer control language) and adds job control information indicating print setting and the like designated by the user and described for example in a PJL (printer job language) command, thereby generating job data for printing.

Meanwhile, some of image output devices such as MFPs (multifunction peripherals) of recent years to produce printed outputs can accept job data in a direct print format (direct output format) and produce a printed output of this data (as described for example in Japanese Patent Application Laid-Open No. 2008-269157). According to direct printing, job control information such as a PJL command is added directly to the header of a document file to generate job data. This allows generation of job data without intervention of a printer driver, thereby offering high convenience. Meanwhile, producing a printed output by direct printing requires an image output device to be compatible with job data in the direct print format.

A document file is stored in and managed by a document server on a network such as a cloud. In order for a user to print a document file stored in the document server, a technique what is called cloud printing is employed. According to the cloud printing, if the user operates an information processing terminal at hand to access the document server, designates a document file to be printed, and then gives a print instruction, the document server transmits job data directly to an image output device designated by the user to make the image output device produce a printed output.

Meanwhile, according to the cloud printing, job data to be transmitted from the document server directly to an image output device should be compatible with the model of this image output device. As an example, if an image output device designated by a user is a model compatible with direct printing, job data can be generated without intervention of a printer driver.

In contrast, if an image output device designated by a user is a mode incompatible with direct printing, the document server should generate job data by starting a printer driver compatible with this image output device and converting data for printing to a page description language compatible with the model of this image output device. However, the document server does not always include an application that enables handling of a document file designated as a print target. Thus, the document server cannot always output data for printing based on a document file to the printer driver. Even supposing that such an application is installed on the document server, making the document server start this application in response to remote control by an information processing terminal may be restricted in advance. Under these circumstances where the document server cannot start the application that enables generation of data for printing based on a document file, it becomes impossible for the document server to generate job data compatible with the model of an image output device. This makes it impossible for the document server to transmit job data directly to an image output device to produce a printed output.

SUMMARY

The present disclosure is generally directed to an image output system, an image output method, a document server, and a non-transitory computer readable recording medium capable of producing a printed output by transmitting job data directly from the document server to an image output device even if the image output device is not compatible with job data in a direct output format.

One or more embodiments of the invention may be directed to an image output system including a document server, an information processing terminal, and an image output device connected through a network. According to one aspect, the image output system may be configured as follows. The information processing terminal designates an output target document out of documents stored in the document server and instructs output of a job to the image output device. If the image output device is not a direct output compatible device capable of outputting a file format of the output target document as it is, the document server converts the output target document to image data in a given file format, generates job data, and transmits the job data to the image output device. The job data contains job control information defining output setting and job substantive information designating the image data as an output target in a page description language. The image output device outputs the output target document based on the job data output from the document server.

One or more embodiments of the invention may be directed to an image output method of outputting a document stored in a document server. The image output method is implemented while the document server, an information processing terminal, and an image output device are connected through a network. According to one aspect, the image output method may include the stages of: making the information processing terminal designate an output target document out of documents stored in the document server and instruct output of a job to the image output device; if the image output device is not a direct output compatible device capable of outputting a file format of the output target document as it is, making the document server convert the output target document to image data in a given file format, generate job data, and transmit the job data to the image output device, the job data containing job control information defining output setting and job substantive information designating the image data as an output target in a page description language; and making the image output device output the output target document based on the job data output from the document server.

One or more embodiments of the invention may be directed to a non-transitory computer readable recording medium storing a program to be executed by a document server including a storage unit storing a document. According to one aspect, execution of the program stored in the non-transitory computer readable recording medium by the document server may cause the document server to function as a system including: an accepting unit that accepts designation of an output target document out of documents stored in the storage unit and designation of an image output device to which the output target document is to be output; a prototype data generating unit that generates job control information and job prototype data containing the job control information, the job control information defining output setting to be applied during output of the output target document; an image converting unit that reads the output target document from the storage unit and converts the output target document to image data in a given file format; a job generating unit that generates job data by adding job substantive information to the job prototype data generated by the prototype data generating unit, the job substantive information designating the image data generated by the image converting unit as an output target in a page description language; and a job outputting unit that outputs the job data generated by the job generating unit to the image output device.

DETAILED DESCRIPTION

Embodiments of the present invention will be described in reference to the figures. Components common to the embodiments are identified by like reference numbers and will not be discussed repeatedly for the sake of brevity.

Figure 1:
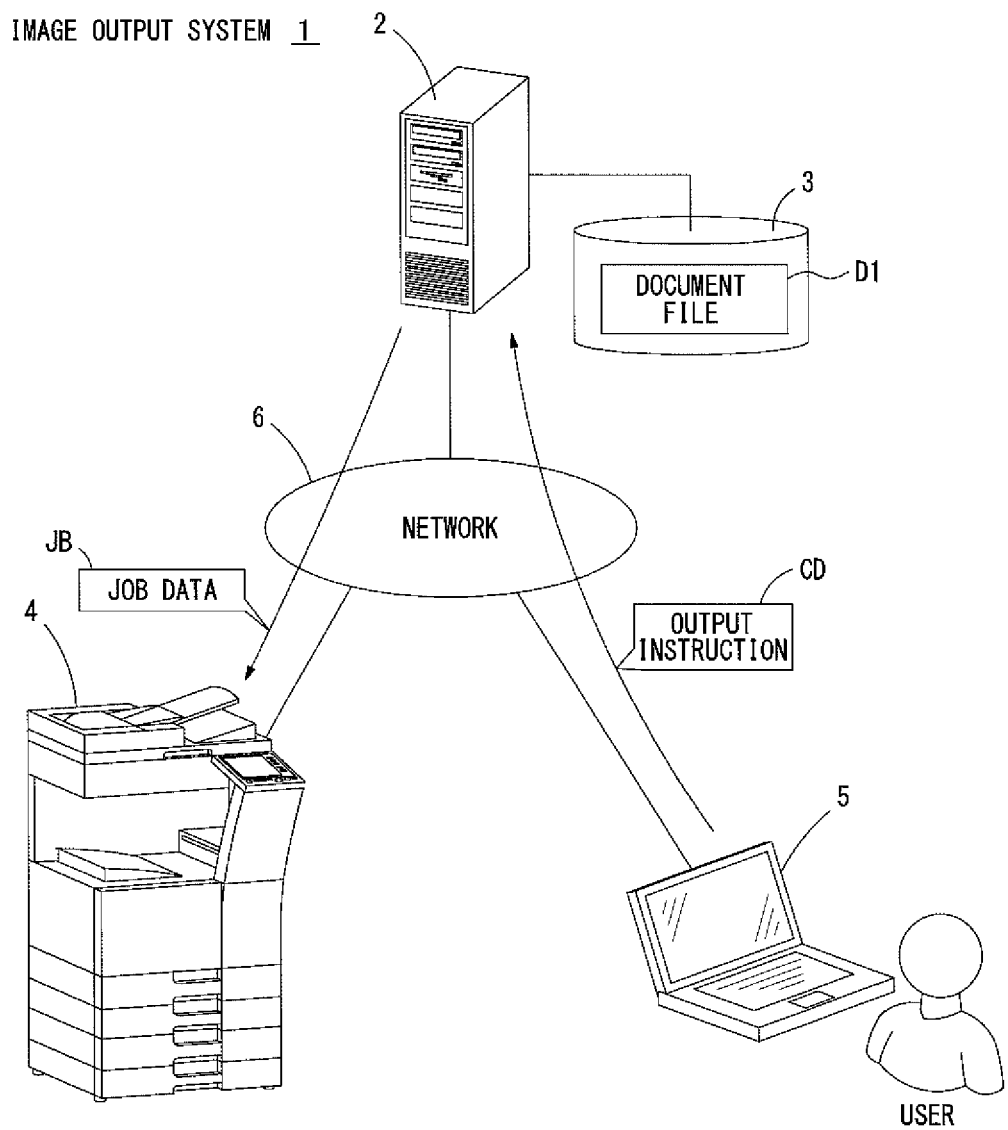
FIG. 1 shows an example of the structure of an image output system.

FIG. 1 shows an example of the structure of an image output system 1 according to one or more embodiments of the present invention. The image output system 1 includes a document server 2, an image output device 4 for example constructed by an MFP, and an information processing terminal 5 for example constructed by a personal computer (PC) or a tablet terminal that can communicate with each other through a network 6. The network 6 includes a LAN (local area network) and the Internet. The document server 2 is for example a cloud server provided on the Internet. The document server 2 includes a nonvolatile storage 3 that stores a document file D1 uploaded through the network 6. The storage 3 is capable of storing multiple document files D1. The image output device 4 is for example installed on an office and has functions such as a printing function and a facsimile function. In response to receipt of job data JB corresponding to each function through the network 6, the image output device 4 executes a job based on the job data JB and outputs an image. The information processing terminal 5 is used in a place such as an office or other than an office while being connected to the network 6. While FIG. 1 shows only one image output device 4 connected to the network 6, multiple image output devices 4 can be connected to the network 6.

A user can designate the document file D1 stored in the storage 3 and instruct the document server 2 to produce a printed output by accessing the document server 2 through operation on the information processing terminal 5. At this time, the user can designate the image output device 4 as an output destination of the job data JB. In response to detection of the instruction from the user to produce a printed output, the information processing terminal 5 transmits an output instruction CD to the document server 2. The output instruction CD contains information for identifying the document file D1 to become an output target and information for identifying the image output device 4 to become an output destination of the job data JB, for example.

In response to receipt of the output instruction CD from the information processing terminal 5, the document server 2 reads the document file D1 to become an output target from the storage 3 based on the output instruction CD, generates the job data JB compatible with the image output device 4, and outputs the resultant job data JB to the image output device 4. If the image output device 4 is a direct output compatible device capable of executing a job based on the job data 3B in a direct output format, the document server 2 generates the job data JB in a direct output format and outputs the resultant job data JB to the image output device 4. If the image output device 4 is a direct output incompatible device incapable of executing a job based on the job data JB in a direct output format, the document server 2 generates the job data JB in a format that is not a direct output format while enabling the image output device 4 to execute a job. Then, the document server 2 transmits the resultant job data JB to the image output device 4. The aforementioned structure and the aforementioned operation of the document server 2 are described in detail below.

Figure 2:
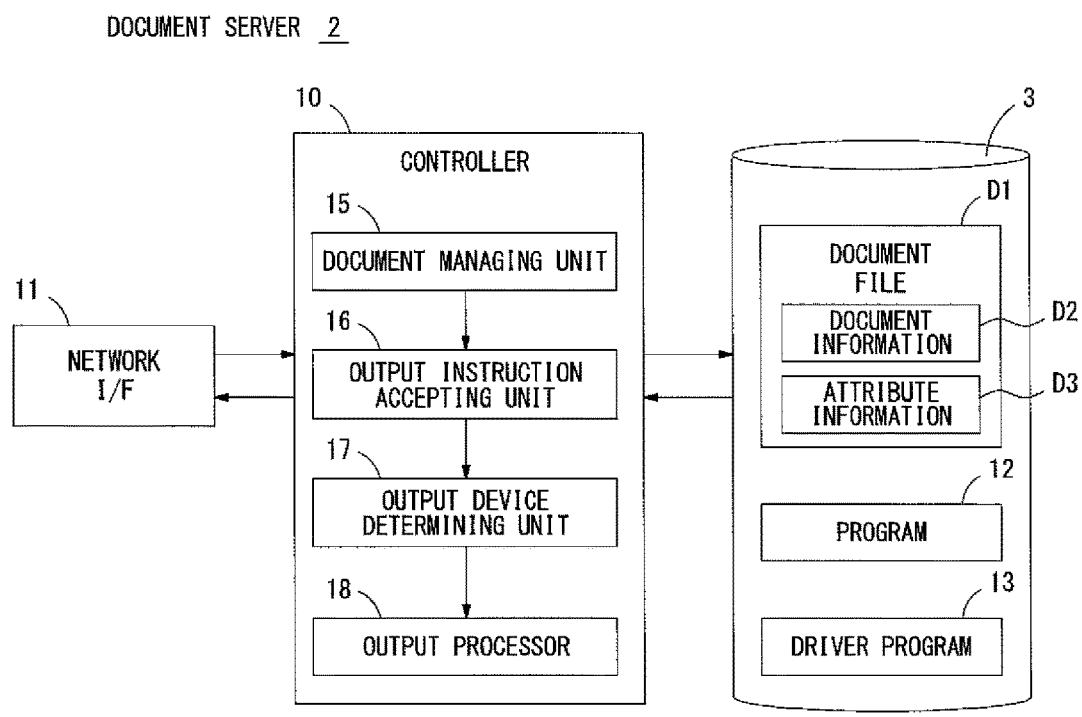
FIG. 2 shows an example of a hardware structure and that of a functional structure of a document server.

FIG. 2 shows an example of a hardware structure and that of a functional structure of the document server 2. The document server 2 includes a controller 10 with a CPU and a memory and a network interface 11 in addition to the storage 3.

The storage 3 stores a program 12 to be executed by the CPU of the controller 10 and a driver program 13 in addition to the document file D1. The program 12 is to make the controller 10 of the document server 2 function as various processors described later. The program 12 is installed in advance on the storage 3. The driver program 13 is to generate the job data JB compatible with the image output device 4 to become an output destination of the job data JB. The driver program 13 may be installed in advance on the storage 3 when the image output device 4 that can be designated by a user as an output destination is registered with the document server 2, for example. However, this is given not for limitation. As an example, when a user designates the image output device 4 as an output destination, the document server 2 may conduct a search on the Internet and acquire the driver program 13 compatible with the image output device 4. Then, the document server 2 may store the acquired driver program 13 into the storage 3.

The document file D1 stored in the storage 3 may be a PDF (portable document format) file or an XPS (XML paper specification) file, for example. The document file D1 enables browsing or editing of a document using a specific application. The document file D1 contains document information D2 forming a substantive part of a document and attribute information D3 about the document showing a page size or the number of pages, for example. The storage 3 can store a plurality of such document files D1.

The CPU reads and executes the program 12, thereby making the controller 10 function as a document managing unit 15, an output instruction accepting unit 16, an output device determining unit 17, and an output processor 18. The network interface 11 is to connect the document server 2 on the network 6 to establish communication of the document server 2 with the image output device 4 and the information processing terminal 5.

The document managing unit 15 manages the document file D1 stored in the storage 3. As an example, when a user operating the information processing terminal 5 logs in to the document server 2, the document managing unit 15 extracts the document file D1 available by the login user from multiple document files stored in the storage 3 and transmits list information to the information processing terminal 5. At this time, the document managing unit 15 identifies at least one image output device 4 available by the user out of multiple image output devices 4 registered in advance with the document server 2, for example. Then, the document managing unit 15 transmits information indicating that the identified image output device 4 can be designated as an output destination of a job. This allows the user to select the document file D1 as an output target from the list information displayed on the information processing terminal 5 and give an instruction to produce a printed output. This further allows the user to designate the image output device 4 to produce the printed output.

The output instruction accepting unit 16 becomes functional in response to receipt of the output instruction CD transmitted from the information processing terminal 5. The output instruction accepting unit 16 identifies the document file D1 to become an output target out of multiple document files stored in the storage 3 based on information in the output instruction CD and identifies the image output device 4 to become an output destination of the document file D1.

The output device determining unit 17 determines whether the image output device 4 designated as an output destination of the document file D1 is a direct output compatible device compatible with direct printing (direct output). As an example, the output device determining unit 17 reads information about the image output device 4 designated by a user as an output destination out of multiple pieces of information about multiple image output devices 4 registered in advance with the document server 2 and determines whether the image output device 4 as an output destination is a direct output compatible device based on the read information. However, this is given not for limitation. The output device determining unit 17 may communicate with the image output device 4 designated by a user to acquire model information or the like from this image output device 4 each time the occasion arises. Then, the output device determining unit 17 may determine whether the image output device 4 is a direct output compatible device based on the acquired model information. After the output device determining unit 17 determines whether the image output device 4 is a direct output compatible device, the controller 10 makes the output processor 18 functional.

The output processor 18 is to generate the job data JB based on the document file D1 designated by a user and transmit the job data JB to the image output device 4 as an output destination.

Figure 3:
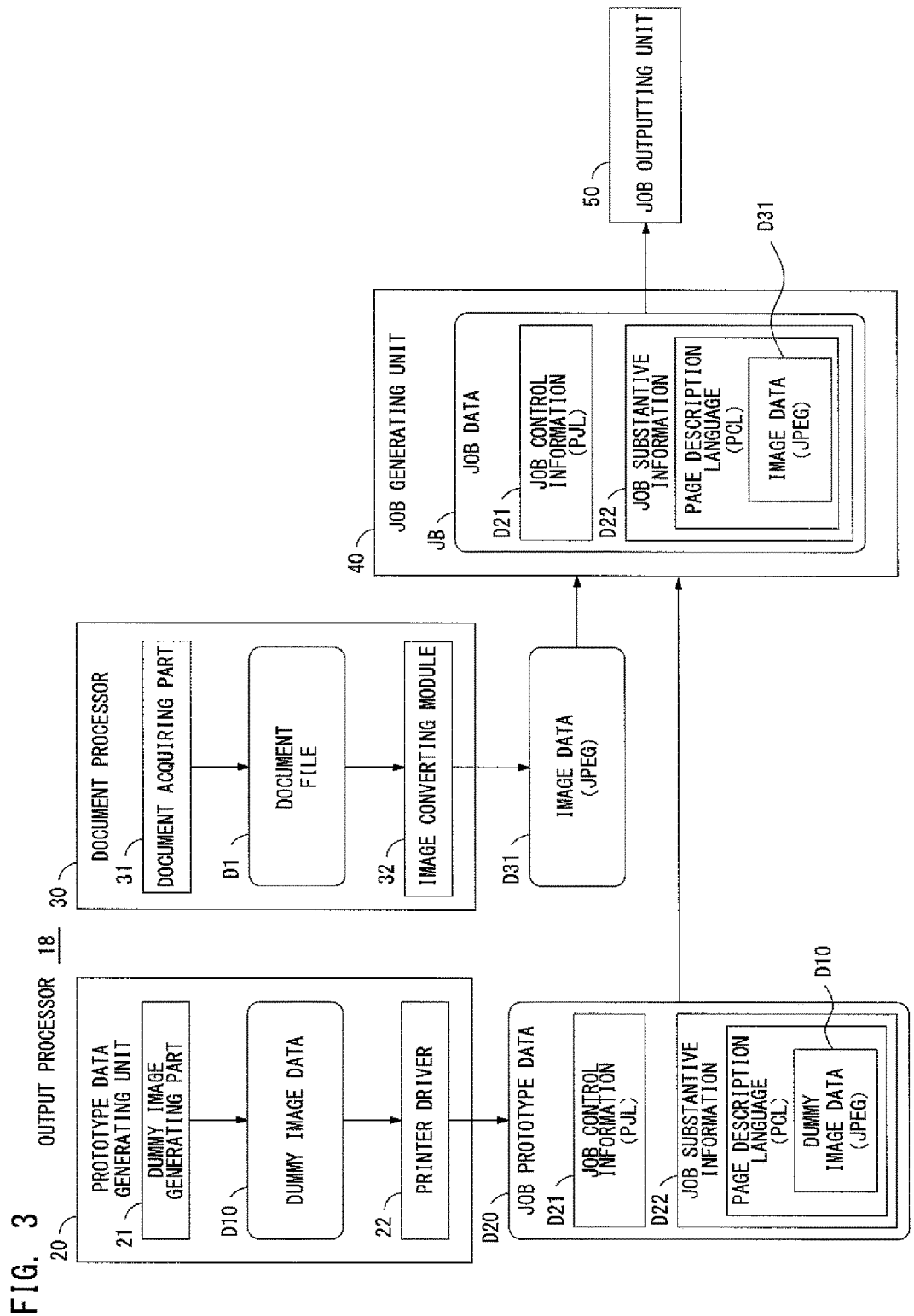
FIG. 3 is a block diagram showing an example of a detailed functional structure of an output processor applied if an image output device is a direct output incompatible device.

FIG. 3 is a block diagram showing an example of a detailed functional structure of the output processor 18. As shown in FIG. 3, the output processor 18 includes a prototype data generating unit 20, a document processor 30, a job generating unit 40, and a job outputting unit 50. The output processor 18 generates the job data JB by performing process differing between the case where the output device determining unit 17 determines that the image output device 4 is a direct output compatible device and the case where the output device determining unit 17 determines that the image output device 4 is a direct output incompatible device incompatible with direct output. FIG. 3 illustrates a functional structure applied if the image output device 4 as an output destination is a direct output incompatible device.

The prototype data generating unit 20 is a processor to generate job prototype data D20 to become a prototype for a job compatible with the image output device 4 designated as an output destination. The prototype data generating unit 20 includes a dummy image generating part 21 and a printer driver 22.

The dummy image generating part 21 reads the attribute information D3 showing a page size, the number of pages or the like from the document file D1 designated as an output target and generates dummy image data D10 having the same attribute as the read attribute information D3. The dummy image data D10 has the same page size and the same number of pages as the document information D2 in the document file D1 and is constructed by the same white or black pixels arranged continuously. Generating the dummy image data D10 constructed by the same pixels arranged continuously can compress the dummy image data D10 in a high ratio. The image data D10 can be compressed in a high ratio only by arranging the same pixels continuously. Thus, these pixels are not limited to white or black. Alternatively, the image data D10 may be constructed by gray-level pixels arranged continuously. If the document file D1 includes an A4 size document with 10 pages, for example, the dummy image generating part 21 generates 10 pages of the blank dummy image data D10 of an A4 size. The dummy image generating part 21 generates the dummy image data D10 as an image file in a given data format such as bitmap or JPEG, for example. Specifically, the dummy image data D10 is generated as a file different from the document file D1.

After the dummy image generating part 21 generates the dummy image data D10, the prototype data generating unit 20 starts the printer driver 22 compatible with the image output device 4 as an output destination. As an example, if the driver program 13 compatible with the image output device 4 designated by a user is installed in advance on the storage 3, the prototype data generating unit 20 reads the driver program 13 from the storage 3 and executes the read driver program 13, thereby starting the printer driver 22. If the driver program 13 compatible with the image output device 4 designated by the user is not installed in advance on the storage 3, the prototype data generating unit 20 conducts a search for example on the Internet and acquires the driver program 13 compatible with the image output device 4 through the Internet. The prototype data generating unit 20 executes the acquired driver program 13 to start the printer driver 22. Then, the dummy image generating part 21 supplies the dummy image data D10 having the same attribute as the attribute information D3 about the document file D1 to the printer driver 22. If there is setting information set by a user about color printing, duplex printing or the like to be applied for producing a printed output, the prototype data generating unit 20 further supplies this setting information to the printer driver 22.

In response to receipt of the dummy image data D10 generated by the dummy image generating part 21 input to the printer driver 22, the printer driver 22 generates the job prototype data D20 based on the input dummy image data D10. Specifically, the printer driver 22 generates job control information D21 by converting the setting information set by a user for example to a PJL (printer job language) command. Further, the printer driver 22 converts the dummy image data D10 generated by the dummy image generating part 21 to a given format such as JPEG to generate job substantive information D22 designating the dummy image data D10 in the given format as an output target in a page description language such as PCL (printer control language). If the dummy image data D10 is already generated as data in a given format such as JPEG when it is input to the printer driver 22, the printer driver 22 is not required to convert the data format of the dummy image data D10. Then, the printer driver 22 generates the job prototype data D20 containing the job control information D21 and the job substantive information D22.

Figure 4:
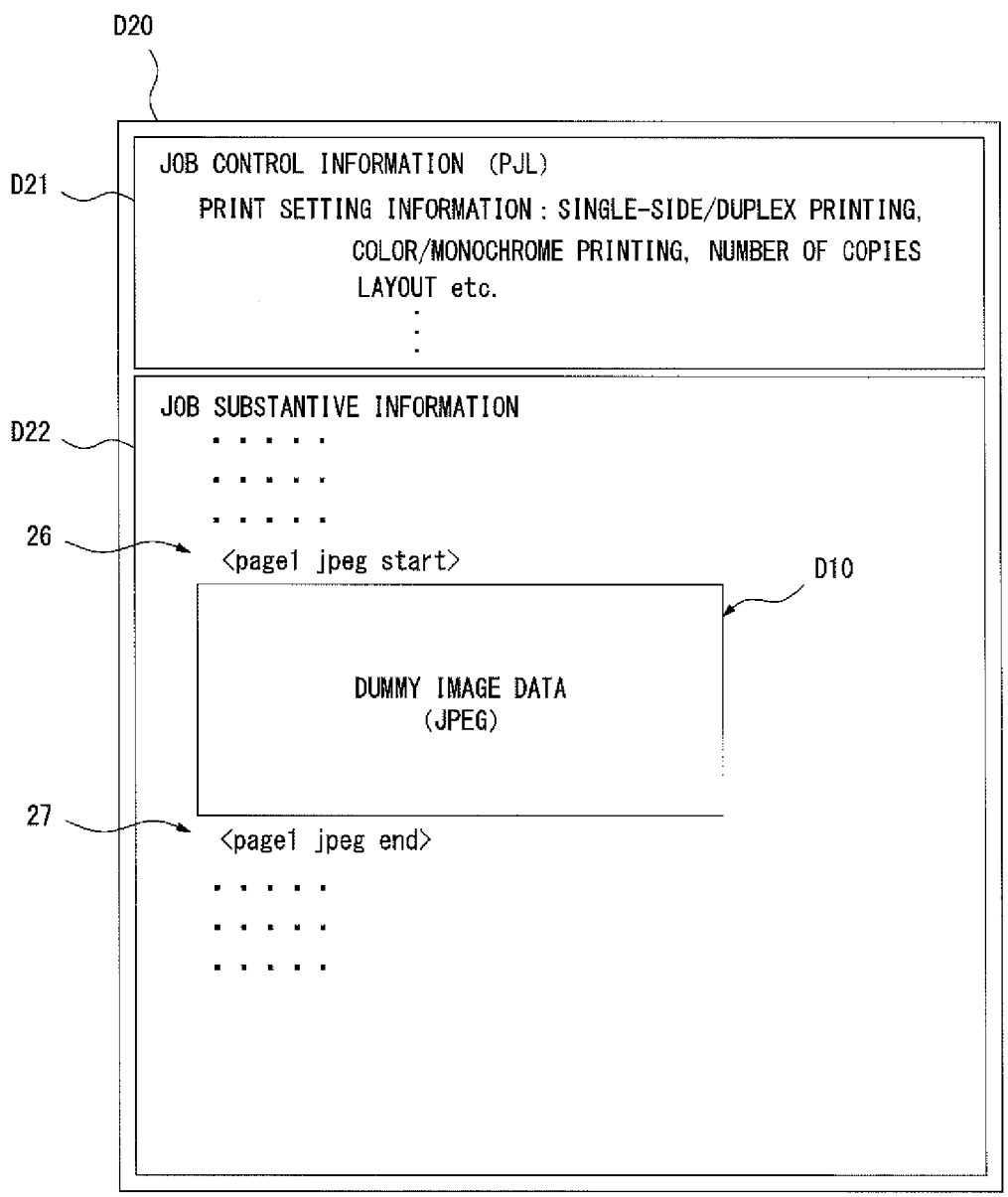
FIG. 4 shows an example of a concept of job prototype data.

FIG. 4 shows a concept of the job prototype data D20 generated by the printer driver 22. As shown in FIG. 4, the job prototype data D20 contains the job control information D21 defining output setting to be applied for producing a printed output and the job substantive information D22 expressed in a page description language. The job substantive information D22 contains the dummy image data D10 in a given format such as JPEG designated as an output target in a page description language. As shown in FIG. 4, for example, the dummy image data D10 is arranged between a first command 26 indicating the beginning of image data in the page description language and a second command 27 indicating the end of the image data. If the dummy image data D10 has multiple pages, image data about each page is arranged between the first and second commands 26 and 27 and each page is designated individually as an output target. The page description language contains information indicating the format of the dummy image data D10 as an output target. In this way, the printer driver 22 generates the job substantive information D22 designating each page of the dummy image data D10 as an output target in the page description language and adds the job control information D21 to the header of the job substantive information D22, thereby generating the job prototype data D20.

The document processor 30 is to process the document file D1 designated as an output target by a user. The document processor 30 includes a document acquiring part 31 and an image converting module 32.

The document acquiring part 31 is to read the document file D1 designated as an output target by a user from the storage 3. If the output device determining unit 17 determines that the image output device 4 is a direct output incompatible device, the document file D1 read by the document acquiring part 31 is supplied to the image converting module 32.

The image converting module 32 is a processor to become functional if the image output device 4 as an output destination of a job is a direct output incompatible device. The image converting module 32 is to convert the substantive document information D2 in the document file D1 to image data D31 in a given format such as JPEG. The image converting module 32 converts the document information D2 to the image data D31 in the same format as the dummy image data D10 in the job substantive information D22 of the job prototype data D20 generated by the printer driver 22. As shown in FIG. 3, for example, if the dummy image data D10 in the job prototype data D20 has a JPEG format, the image converting module 32 generates the image data D31 in a JPEG format based on the document information D2 in the document file D1. If the document file D1 is constructed by a document with multiple pages, the image converting module 32 generates the image data D31 independently for each of these pages.

The job generating unit 40 is a processor to generate the job data JB to be output to the image output device 4 as an output destination. If the image output device 4 as an output destination of a job is a direct output incompatible device, the job generating unit 40 retrieves the job prototype data D20 generated by the prototype data generating unit 20 and replaces the dummy image data D10 included inside a page description language describing the job substantive information D22 of the retrieved job prototype data D20 by the image data D31 generated by the image converting module 32, thereby generating the job data JB.

Figure 5:
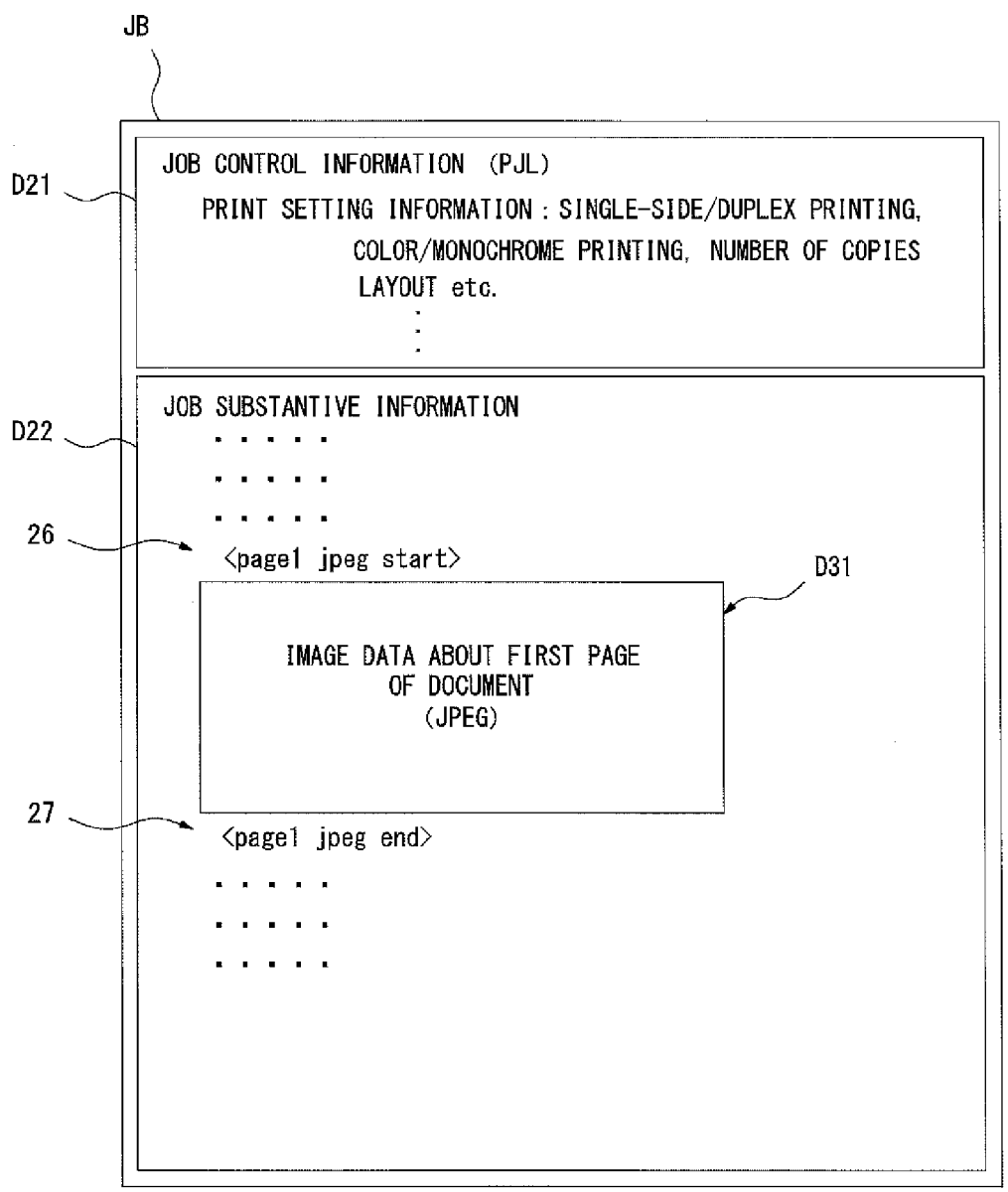
FIG. 5 shows an example of job data generated by a job generating unit if the image output device is a direct output incompatible device.

FIG. 5 shows an example of the job data JB generated by the job generating unit 40 if the image output device 4 is a direct output incompatible device. This job data JB is generated based on the job prototype data D20 of FIG. 4. If the image output device 4 is a direct output incompatible device, the image data D31 generated by the image converting module 32 takes the place of the dummy image data D10. This places the image data D31 based on the document file D1 between the first and second commands 26 and 27 of a page description language as shown in FIG. 5. Specifically, as a result of the replacement of image data, the image data D31 based on the document file D1 is designated as an output target in the page description language. The dummy image data D10 removed from the inside of the page description language and the image data D31 added to the inside of the page description language have the same data format. Thus, for generating the job data JB for the image output device 4 incompatible with direct printing, the job generating unit 40 is only required to replace image data and is not required to make any change to the page description language generated by the printer driver 22.

After the job generating unit 40 generates the job data JB in the aforementioned way, this job data JB is supplied to the job outputting unit 50. In response to acquisition of the job data JB from the job generating unit 40, the job outputting unit 50 outputs the acquired job data JB to the image output device 4 as an output destination and makes the image output device 4 execute a job.

As described above, if the image output device 4 is a direct output incompatible device, the document server 2 converts the document file D1 as an output target to the image data D31 in a given file format. Then, the document server 2 generates the job substantive information D22 designating the image data D31 as an output target in a page description language and adds the job substantive information D22 to the job prototype data D20, thereby generating the job data JB capable of being executed by the image output device 4. This allows the image output device 4 as a direct output incompatible device to execute a job properly based on the job data JB received from the document server 2, so that the image output device 4 can produce a printed output based on the document file D1.

In the aforementioned structure, the document server 2 is not required to start a dedicated application that enables handling of the document file D1. This brings the advantage of making the document server 2 transmit the job data JB directly to the image output device 4 to make the image output device 4 execute a job even if the image output device 4 is a direct output incompatible device.

Figure 6:
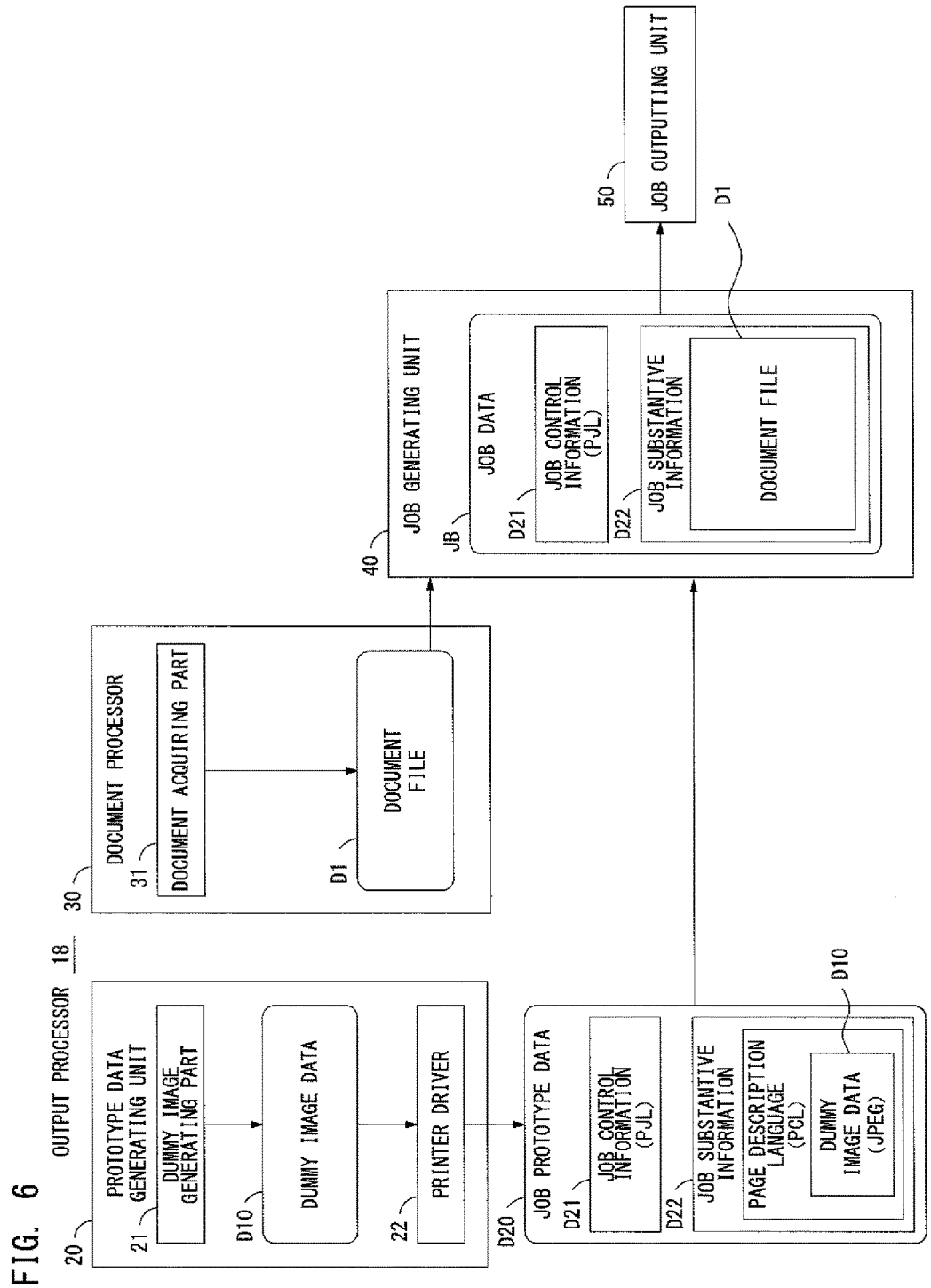
FIG. 6 is a block diagram showing an example of a detailed functional structure of the output processor applied if the image output device is a direct output compatible device.

The following describes the case where the image output device 4 designated as an output destination is a direct output compatible device. FIG. 6 is a block diagram showing an example of a detailed functional structure of the output processor 18 applied if the image output device 4 is a direct output compatible device. In this case, the document processor 30 and the job generating unit 40 in the output processor 18 perform processes different from their processes described above. Meanwhile, like in the case where the image output device 4 is a direct output incompatible device, the prototype data generating unit 20 generates the job prototype data D20 and outputs the resultant job prototype data D20 to the job generating unit 40.

If the image output device 4 is a direct output compatible device, the document processor 30 makes only the document acquiring part 31 functional. The document acquiring part 31 acquires the document file D1 as an output target from the storage 3 and outputs the acquired document file D1 to the job generating unit 40.

If the image output device 4 as an output destination of a job is a direct output compatible device, the job generating unit 40 retrieves the job prototype data D20 generated by the prototype data generating unit 20 and the document file D1 acquired by the document acquiring part 31. Then, the job generating unit 40 replaces an entire part in a page description language included in the job substantive information D22 of the job prototype data D20 by the document file D1 to generate the job data JB in a direct print format.

Figure 7:
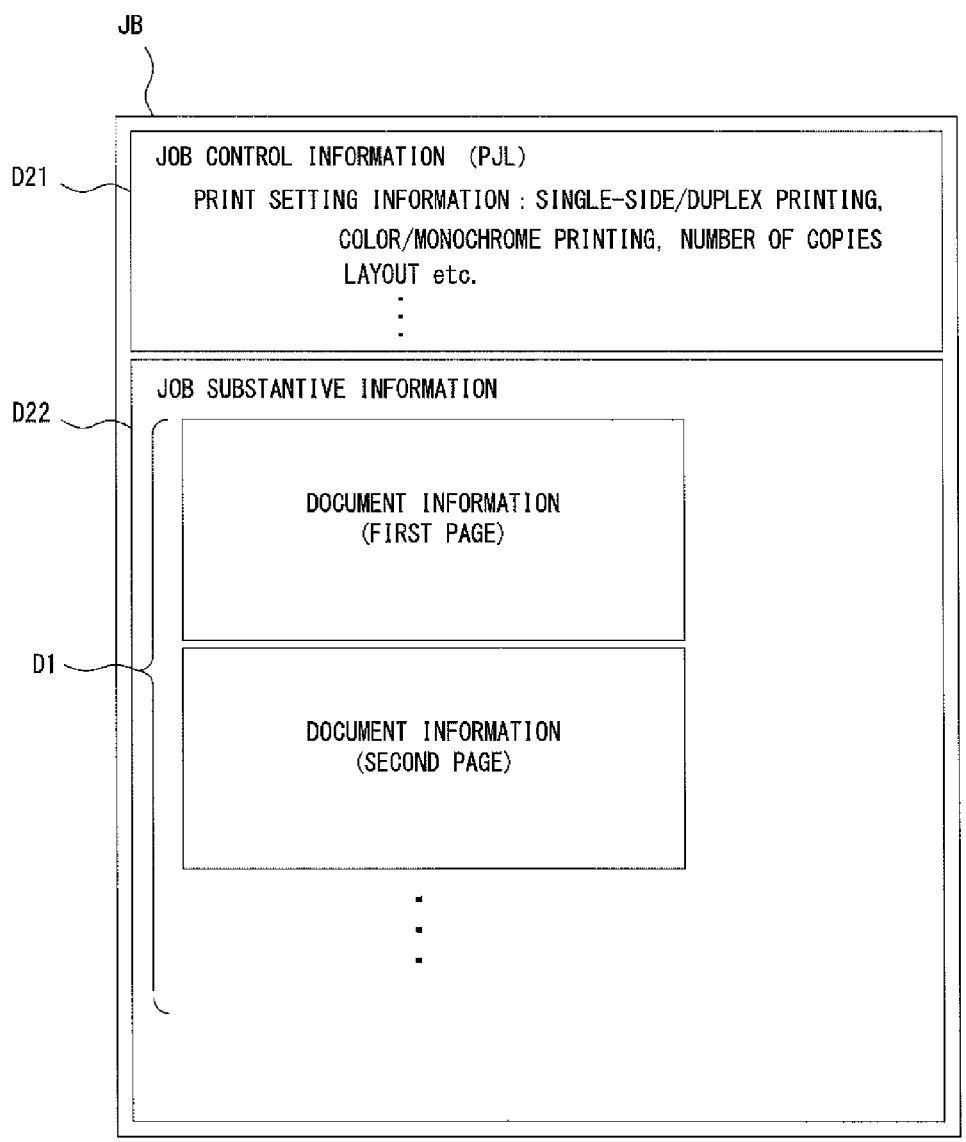
FIG. 7 shows an example of job data generated by the job generating unit if the image output device is a direct output compatible device.

FIG. 7 shows an example of the job data JB generated by the job generating unit 40 if the image output device 4 is a direct output compatible device. This job data JB is also generated based on the job prototype data D20 of FIG. 4. If the image output device 4 is a direct output compatible device, the job substantive information D22 expressed in the page description language and included in the job prototype data D20 is entirely replaced by the document file D1. Thus, as shown in FIG. 7, the job substantive information D22 of the job data JB is constructed by the document file D1.

The job outputting unit 50 outputs the job data JB such as that shown in FIG. 7 generated by the job generating unit 40 to the image output device 4 as a direct output compatible device. Specifically, the document server 2 transmits the job data JB in a direct print format directly to the image output device 4 to make the image output device 4 execute a job.

As described above, if the image output device 4 is a direct output compatible device, the document server 2 adds the document file D1 read from the storage 3 to become the job substantive information D22 to the job prototype data D20 generated by the prototype data generating unit 20, thereby generating the job data JB capable of being executed by the image output device 4. This allows the image output device 4 as a direct output compatible device to execute a job properly based on the job data JB received from the document server 2, so that the image output device 4 can produce a printed output based on the document file D1. In this case, the document server 2 is also not required to start a dedicated application that enables handling of the document file D1.

Figure 8:
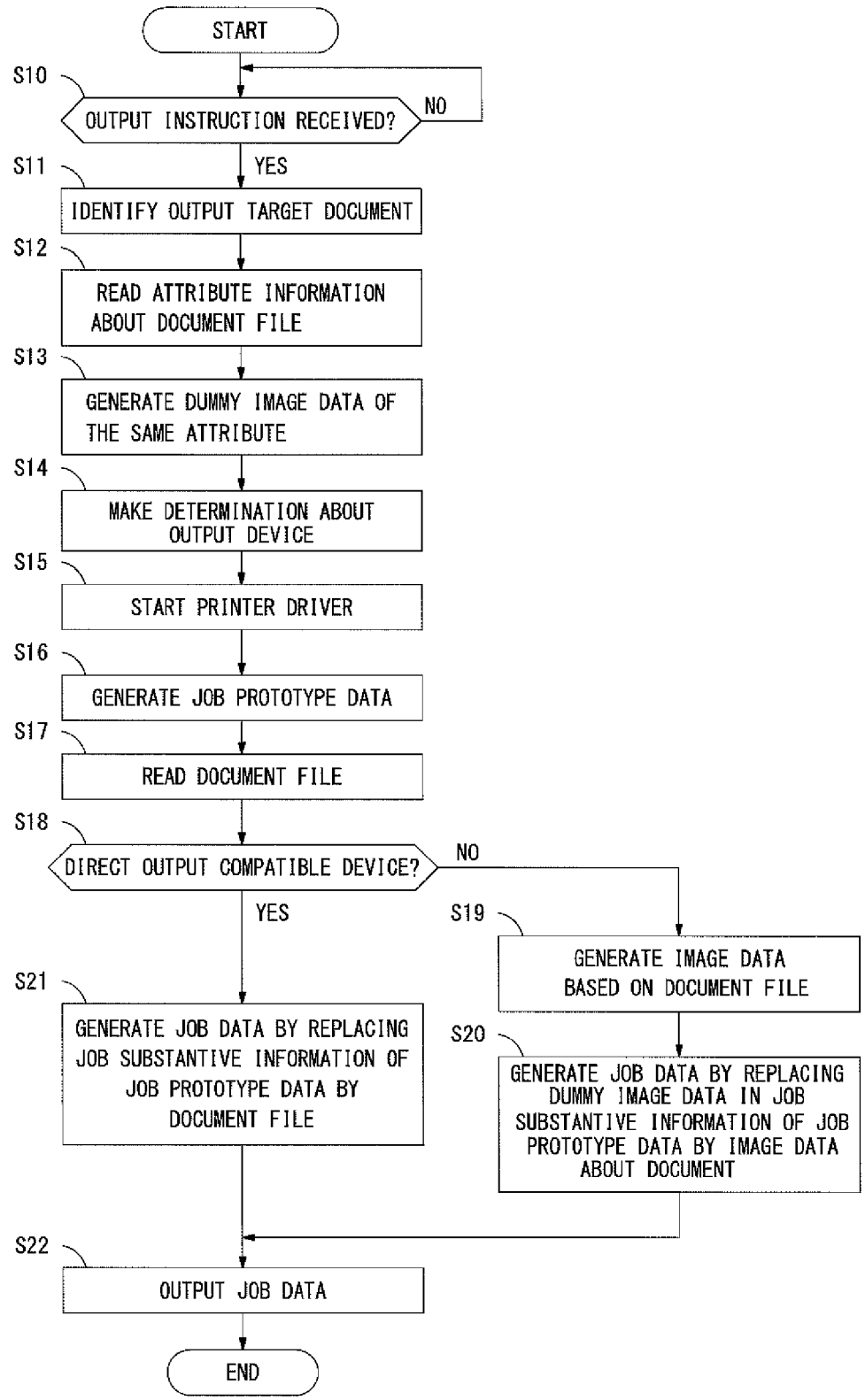
FIG. 8 is a flowchart showing an example of a procedure taken by the document server.

A particular procedure taken by the document server 2 is described next. FIG. 8 is a flowchart showing an example of the procedure taken by the document server 2. After starting the procedure, the document server 2 determines whether the output instruction CD has been received from a user (step S10). If the output instruction CD has been received (YES of step S10), the document server 2 proceeds to process in step S11 and those in subsequent steps. If the output instruction CD has been received from the information processing terminal 5, the document server 2 identifies the document file D1 designated as an output target based on the received output instruction CD (step S11) and reads the attribute information D3 about the identified document file D1 (step S12). Then, the document server 2 makes the prototype data generating unit 20 functional to generate the dummy image data D10 having the same attribute as the attribute information D3 about the document file D1 (step S13).

Next, the document server 2 makes determination about the image output device 4 as an output destination designated by the user (step S14). At this time, the document server 2 identifies the model or the like of the image output device 4 and identifies the image output device 4 in terms of whether the image output device 4 is a direct output compatible device. Then, the document server 2 starts the printer driver 22 compatible with the image output device 4 identified in step S14 (step S15) and supplies the dummy image data D10 generated in step S13 to this printer driver 22, thereby generating the job prototype data D20 containing the dummy image data D10 (step S16).

Then, the document server 2 reads the document file D1 from the storage 3 (step S17). Next, the document server 2 determines whether the image output device 4 to become an output destination is a direct output compatible device (step S18). If the image output device 4 is determined not to be a direct output compatible device (NO of step S18), the document server 2 generates the image data D31 based on the document file D1 (step S19). Then, the document server 2 replaces the dummy image data D10 included in the job prototype data D20 by the image data D31 generated based on the document file D1, thereby generating the job data JB (step S20).

Meanwhile, if the image output device 4 is determined to be a direct output compatible device (YES of step S18), the document server 2 replaces the job substantive information D22 expressed in a page description language and included in the job prototype data D20 by the document file D1, thereby generating the job data JB (step S21). The document server 2 thereafter outputs the job data JB generated in step S20 or S21 to the image output device 4 and then completes the processing.

As described above, in the image output system 1 according to one or more embodiments, the information processing terminal 5 designates the document file D1 to become an output target out of document files stored in the document server 2 and instructs output of a job to the image output device 4. If the image output device 4 is not a direct output compatible device capable of outputting a file format of the document file D1 as it is to become an output target, the document server 2 converts this document file D1 to the image data D31 in a given file format. Then, the document server 2 generates the job data JB containing the job control information D21 defining output setting and the job substantive information D22 designating the image data D31 as an output target in a page description language and transmits the resultant job data JB to the image output device 4. This allows the image output device 4 not a direct output compatible device to produce a printed output and the like based on the job data JB output from the document server 2 and based on the document file D1.

If the image output device 4 is a direct output compatible device capable of outputting a file format of the document file D1 as it is, the document server 2 generates the job data JB containing the job control information D21 defining output setting and the job substantive information D22 constructed by the document file D1 as an output target and transmits the resultant job data JB to the image output device 4. This allows the document server 2 to transmit the job data JB in a direct print format to a direct output compatible device and make this device execute a job.

In the description given above, a job transmitted from the document server 2 to the image output device 4 is mainly a print job for producing a printed output. Meanwhile, the document server 2 is capable of transmitting not only a print job but also a facsimile job for facsimile transmission to the image output device 4. In this case, based on the output instruction CD transmitted from the information processing terminal 5, the output instruction accepting unit 16 determines whether a job based on the document file D1 is to be output either as a print job or as a facsimile job. If the job is to be output as a facsimile job, the output processor 18 generates the job data JB by performing the same process as that to be performed if a direct output incompatible device is an output destination. Specifically, if the job to be output is a facsimile job, the document server 2 generates the job data JB with the job substantive information D22 in a page description language that contains the image data D31 generated by the image converting module 32 based on the document file D1 as shown in FIG. 5. According to such job data JB, the image data D31 in a given format such as JPEG is designated as an output target in the page description language. By generating and transmitting such job data JB if the job as an output target is a facsimile job, the image output device 4 is allowed to transmit data about each pixel as it is in a raster format based on the image data D31 while transmitting the data by facsimile based on the job data JB. This eliminates the need for rasterizing process by the image output device 4, bringing the advantage of reducing a burden on the image output device 4 during facsimile transmission.

The document server 2 according to one or more embodiments generates the dummy image data D10 having the same attribute as the attribute information D3 about the document file D1 and being constructed by the same pixels arranged continuously. This can compress the dummy image data D10 in a high ratio to be discarded during the course of generation of the job data JB. This achieves reduction for example in memory occupancy by the dummy image data D10, bringing the advantage of suppressing reduction in processing efficiency to be caused by the dummy image data D10.

In the aforementioned description, generation of the job prototype data D20 by the prototype data generating unit 20 includes generation of the dummy image data D10 based on the attribute information D3 about the document file D1. This dummy image data D10 is discarded during the course of generation of the job data JB to be transmitted to the image output device 4. However, the invention is not limited so. One or more embodiments of the present invention is directed to a structure of generating the job data JB that is compatible with the image output device 4 as an output destination without generating the dummy image data D10.

Figure 9:
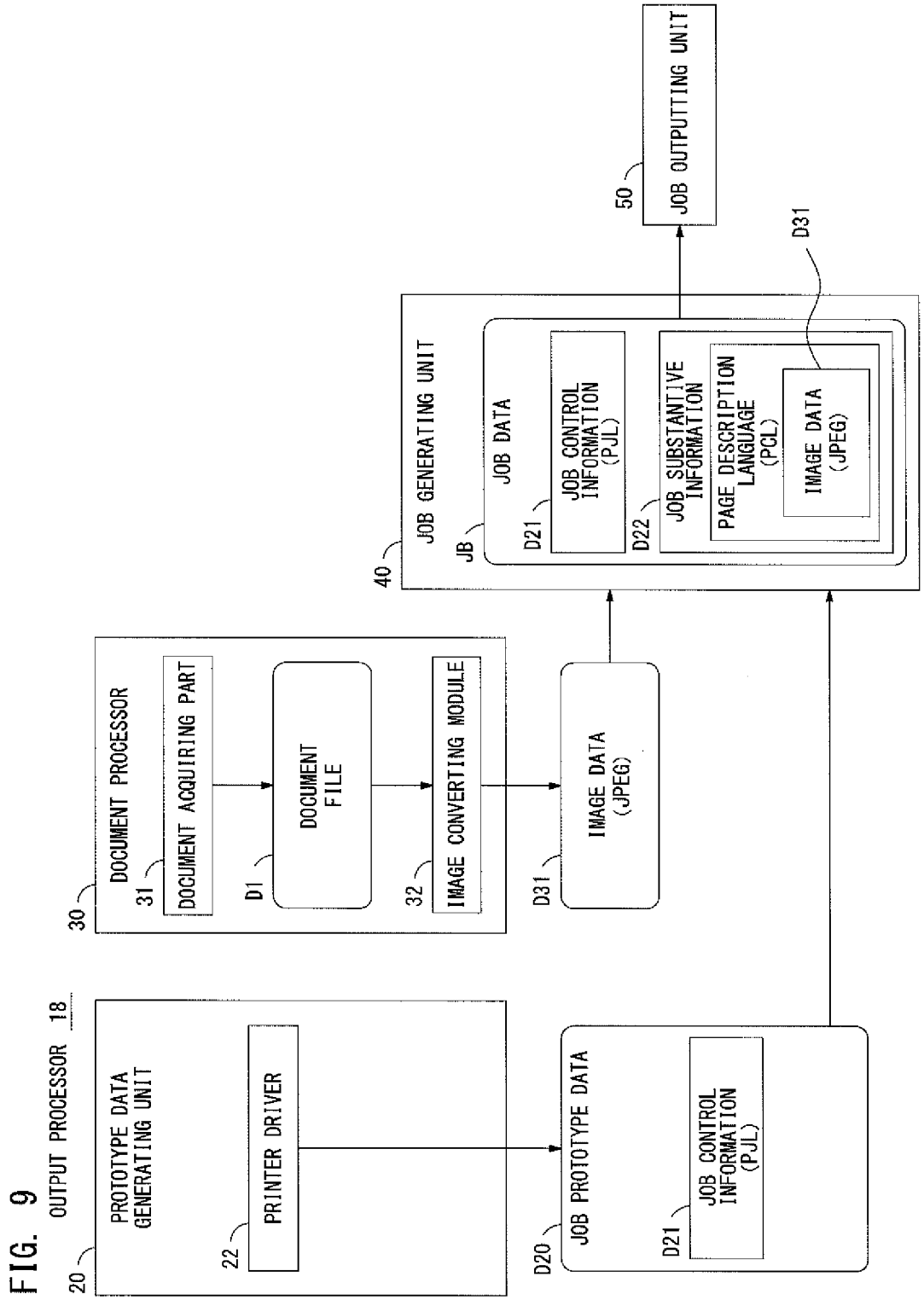
FIG. 9 is a block diagram showing an example of a detailed functional structure of an output processor applied if an image output device is a direct output incompatible device.

FIG. 9 is a block diagram showing an example of a detailed functional structure of the output processor 18. Similar to the above-described embodiments, the output processor 18 includes the prototype data generating unit 20, the document processor 30, the job generating unit 40, and the job outputting unit 50. The output processor 18 generates the job data JB by performing process differing between the case where the output device determining unit 17 determines that the image output device 4 is a direct output compatible device and the case where the output device determining unit 17 determines that the image output device 4 is a direct output incompatible device incompatible with direct output. FIG. 9 illustrates a functional structure applied if the image output device 4 as an output destination is a direct output incompatible device.

The prototype data generating unit 20 is a processor to generate the job prototype data D20 to become a prototype for a job compatible with the image output device 4 designated as an output destination. The prototype data generating unit 20 includes the printer driver 22. Specifically, the prototype data generating unit 20 according to one or more embodiments does not include the dummy image generating part 21 so does not generate the dummy image data D10. The printer driver 22 generates the job control information D21 by converting setting information set by a user for example to a PJL (printer job language) command to generate the job prototype data D20 containing only the job control information D21. Specifically, according to one or more embodiments, the resultant job prototype data D20 does not contain the job substantive information D22. Thus, the driver program 13 to be executed by the prototype data generating unit 20 for starting the printer driver 22 is not always required to be a program dedicated to the image output device 4. Alternatively, the driver program 13 may be a general-purpose program that enables generation of the job control information D21 capable of being interpreted by the image output device 4. The driver program 13 prepared as the general-purpose program can be installed in advance on the storage 3. This brings the advantage of eliminating the need for a search on the Internet or the like to be conducted to coincide with timing of receipt of the output instruction CD. The prototype data generating unit 20 outputs the job prototype data D20 to the job generating unit 40.

The document processor 30 and its operations have been described above. Further, if the image output device 4 is a direct output incompatible device, the image converting module 32 become functional as shown in FIG. 9. The image converting module 32 converts the substantive document information D2 in the document file D1 acquired by the document acquiring part 31 to the image data D31 in a given format such as JPEG. The document processor 30 outputs the image data D31 generated based on the document file D1 to the job generating unit 40.

If the image output device 4 is a direct output incompatible device, the job generating unit 40 retrieves the job prototype data D20 containing the job control information D21 and the image data D31 generated based on the document file D1 to generate the job data JB. In response to input of the image data D31, the job generating unit 40 generates the job substantive information D22 designating the image data D31 as an output target in a page description language capable of being interpreted by the image output device 4 and adds the resultant job substantive information D22 to the job control information D21, thereby generating the job data JB. Thus, the job data JB generated by the job generating unit 40 if the image output device 4 is a direct output incompatible device is the same as data generated in the example described above. As an example, the job data JB such as that shown in FIG. 5 is generated.

Figure 10:
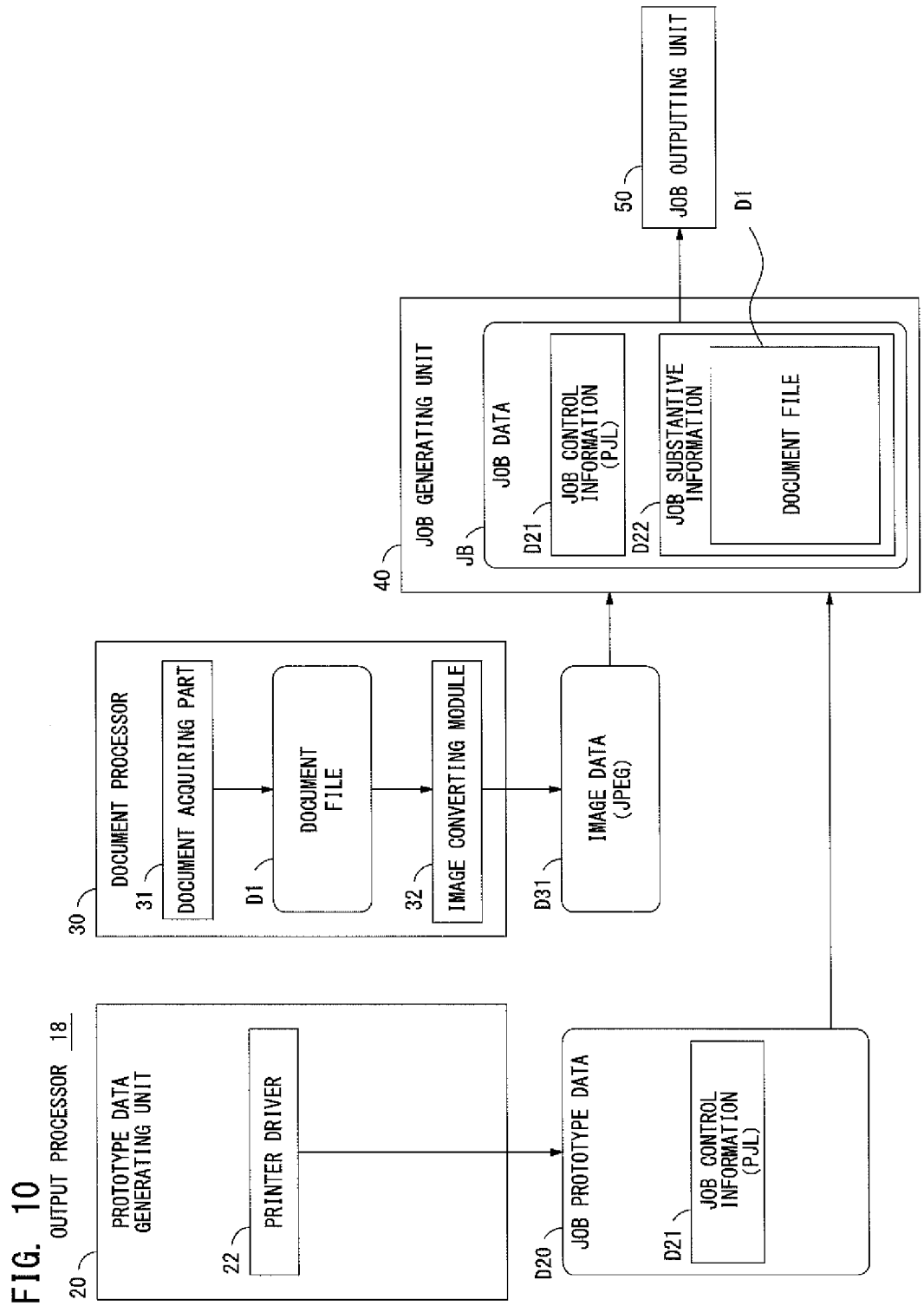
FIG. 10 is a block diagram showing an example of a detailed functional structure of the output processor applied if the image output device is a direct output compatible device.

The following describes the case where the image output device 4 is a direct output compatible device. FIG. 10 is a block diagram showing an example of a detailed functional structure of the output processor 18 applied if the image output device 4 is a direct output compatible device. In this case, the document processor 30 and the job generating unit 40 in the output processor 18 perform processes different from their processes described above. Meanwhile, like in the case where the image output device 4 is a direct output incompatible device, the prototype data generating unit 20 generates the job prototype data D20 and outputs the resultant job prototype data D20 to the job generating unit 40.

If the image output device 4 is a direct output compatible device, the document processor 30 makes only the document acquiring part 31 functional. The document acquiring part 31 acquires the document file D1 as an output target from the storage 3 and outputs the acquired document file D1 to the job generating unit 40.

If the image output device 4 as an output destination of a job is a direct output compatible device, the job generating unit 40 retrieves the job prototype data D20 generated by the prototype data generating unit 20 and the document file D1 acquired by the document acquiring part 31. The job generating unit 40 regards the document file D1 as the job substantive information D22 and adds the job substantive information D22 to the job control information D21 in the job prototype data D20, thereby generating the job data JB. Thus, the job data JB generated by the job generating unit 40 if the image output device 4 is a direct output compatible device is the same data described above in reference to FIG. 5. As another example, the job data JB such as that shown in FIG. 7 is generated.

Certain embodiments of the present invention do not involve generation of the dummy image data D10 to be discarded during the course of generation of the job data JB. This makes it possible to generate the job data JB efficiently without causing increase in a memory usage.

The present invention is not to be limited to the aforementioned examples, but can be modified in various ways.

For example, the document server 2 was described as being constructed by one server. However, the invention is not so limited. Alternatively, the aforementioned function of the document server 2 may be carried out by multiple servers. For example, a server to store and manage the document file D1 and a server to generate the job data JB may be prepared as different servers.

For example, the document server 2 was described as a cloud server provided on the Internet. However, the invention is not so limited. For example, the document server 2 may be provided on a local area network in an office environment.

For example, a user operates the information processing terminal 5 and the output instruction CD is transmitted from the information processing terminal 5 to the document server 2. However, the invention is not so limited. For example, the output instruction CD may be transmitted from the image output device 4 to the document server 2 in response to user's operation on the image output device 4. The aforementioned technique of generating the job data JB is also applicable to this case.

While the invention has been described with respect to a limited number of examples, those skilled in the art, having benefit of this disclosure, will appreciate that other embodiments can be devised which do not depart from the scope of the invention as disclosed herein. Furthermore, one of ordinary skill in the art would appreciate that certain "units" may be implemented by a circuit, processor, etc., using any known methods. Accordingly, the scope of the disclosure should be limited only by the attached claims.

What is claimed is:

1. An image output system comprising:
   a document server comprising a processor that executes the driver program;
   an information processing terminal; and
   a multifunction peripheral (MFP) connected in a network, wherein:
   the information processing terminal designates an output target document out of a list of user documents stored in the document server and instructs output of a job to the MFP,
   if the MFP is not a direct output compatible device that outputs a file format of the output target document, the document server converts the output target document to image data in a given file format, generates job data, and transmits the job data to the MFP, the job data comprising job control information defining output setting and job substantive information designating the image data as an output target in a page description language,
   the MFP outputs the output target document based on the job data output from the document server,
   the document server conducts a search on the network connected to the document server to acquire the driver program if the driver program is not installed in a storage,
   the driver program generates a job prototype data of the job data transmitted to the MFP,
   the processor generates dummy image data based on attribute information of the output target document, and
   the dummy image data comprises gray-level pixels arranged continuously and same attribute information of the output target document comprised of a page size and number of pages.

2. The image output system according to claim 1, wherein,
   if the MFP is the direct output compatible device that outputs a file format of the output target document, the document server generates the job data and transmits the job data to the MFP, and
   the job data comprises the job control information defining the output setting and the job substantive information constructed by the output target document.

3. The image output system according to claim 1, wherein
   the driver program generates the job control information and the job prototype data comprising the job control information, the job control information defining the output setting to be applied during output of the output target document, and
   the processor further:
      reads the output target document and converts the output target document to image data in a given file format if the MFP is not a direct output compatible device that outputs a file format of the output target document;
      generates the job data by adding job substantive information to the job prototype data, the job substantive information designating the image data as the output target in the page description language; and outputs the job data to the MFP.

4. The image output system according to claim 3, wherein the processor:
generates the job prototype data further comprising the job substantive information, the dummy image data having the same attribute as the attribute information, the job substantive information designating the dummy image data as the output target in the page description language, and
generates the job data by replacing the dummy image data in the job substantive information of the job prototype data with the image data generated.

5. The image output system according to claim 3, wherein the processor:
accepts destination indicating whether the output target document is to be output as a print job or as a facsimile job, and
if the output target document is to be output as the facsimile job, generates the job substantive information and the job data by adding the job substantive information to the job prototype data, the job substantive information designating the image data as the output target in the page description language.

6. An image output method of outputting a document stored in a document server, wherein the image output method is implemented while the document server, an information processing terminal, and a multifunction peripheral (MFP) are connected in a network, the image output method comprising:
making the information processing terminal designate an output target document out of a list of user documents stored in the document server and instructing output of a job to the MFP;
if the MFP is not a direct output compatible device that outputs a file format of the output target document, making the document server convert the output target document to image data in a given file format, generate job data, and transmit the job data to the MFP, the job data comprising job control information defining output setting and job substantive information designating the image data as an output target in a page description language;
making the MFP output the output target document based on the job data output from the document server;
searching, by the document server, on the network connected to the document server to acquire a driver program if the driver program is not installed in a storage;
generating, by the driver program, a job prototype data of the job data transmitted to the MFP; and
generating, by a processor that executes the driver program, dummy image data based on attribute information about the output target document,
wherein the dummy image data comprises gray-level pixels arranged continuously and same attribute information of the output target document comprised of a page size and number of pages.

7. A document server comprising: a storage that stores a document; and a processor that:
accepts destination of an output target document out of user documents stored in the storage and designation of a multifunction peripheral (MFP) to which the output target document is to be output;
generates job control information and job prototype data comprising the job control information, the job control information defining output setting to be applied during output of the output target document;
reads the output target document from the storage and converts the output target document to image data in a given file format;
generates job data by adding job substantive information to the job prototype data, the job substantive information designating the image data as an output target in a page description language; and
outputs the job data to the MFP, wherein:
the document server conducts a search on a network connected to the document server to acquire a driver program if the driver program is not installed in the storage,
the driver program is executed by the processor to generate a job prototype data of the job data that is output to the MFP,
the processor generates dummy image data based on attribute information about the output target document, and
the dummy image data comprises gray-level pixels arranged continuously and same attribute information of the output target document comprised of a page size and number of pages.

8. The document server according to claim 7, wherein the processor determines whether the MFP is a direct output compatible device that outputs a file format of the output target document, and
if the processor determines that the MFP is not the direct output compatible device, the processor converts the output target document to the image data, and
if the processor determines that the MFP is not the direct output compatible device, the processor generates the job substantive information and the job data by adding the job substantive information to the job prototype data, the job substantive information designating the image data generated as the output target in the page description language.

9. The document server according to claim 8, wherein if the processor determines that the MFP is the direct output compatible device, the processor reads the output target document from the storage and generates the job data by adding the output target document as the job substantive information to the job prototype data.

10. The document server according to claim 7, wherein the processor:
generates the job prototype data further comprising the job substantive information, the dummy image data having the same attribute as the attribute information, the job substantive information designating the dummy image data as the output target in the page description language, and
generates job data by replacing the dummy image data in the job substantive information of the job prototype data with the image data.

11. The document server according to claim 7, wherein the processor:
accepts destination indicating whether the output target document is to be output as a print job or as a facsimile job, and
if the output target document is to be output as the facsimile job, the processor generates the job substantive information and the job data by adding the job substantive information to the job prototype data, the job substantive information designating the image data as the output target in the page description language.

12. A non-transitory computer readable recording medium storing a program to be executed by a document server comprising a storage storing a document, execution of the program by the document server causing the document server to function as a system comprising:
- a memory; and
- a processor coupled to the memory that:
- accepts destination of an output target document out of user documents stored in the storage and designation of a multifunction peripheral (MFP) to which the output target document is to be output;
- generates job control information and job prototype data comprising the job control information, the job control information defining output setting to be applied during output of the output target document;
- reads the output target document from the storage and converts the output target document to image data in a given file format;
- generates job data by adding job substantive information to the job prototype data, the job substantive information designating the image data as an output target in a page description language; and
- outputs the job data to the MFP, wherein;
- the document server conducts a search on a network connected to the document server to acquire a driver program if the driver program is not installed in the storage,
- driver program is executed by the processor to generate a job prototype data of the job data that is output to the MFP,
- the processor generates dummy image data based on attribute information about the output target document, and
- the dummy image data comprises gray-level pixels arranged continuously and same attribute information of the output target document comprised of a page size and number of pages.

13. The non-transitory computer readable recording medium according to claim 12, wherein:
- the processor determines whether the MFP is the direct output compatible device that outputs a file format of the output target document,
- if the processor determines that the MFP is not the direct output compatible device, the processor converts the output target document to the image data, and
- if the processor determines that the MFP is not the direct output compatible device, the processor generates the job substantive information and the job data by adding the job substantive information to the job prototype data, the job substantive information designating the image data as the output target in the page description language.

14. The non-transitory computer readable recording medium according to claim 13, wherein if the processor determines that the MFP is the direct output compatible device, the processor reads the output target document from the storage and generates the job data by adding the output target document as the job substantive information to the job prototype data.

15. The non-transitory computer readable recording medium according to claim 12, wherein the processor:
- generates the job prototype data further comprising the job substantive information, the dummy image data having the same attribute as the attribute information, the job substantive information designating the dummy image data as the output target in the page description language, and
- generates job data by replacing the dummy image data in the job substantive information of the job prototype data with the image data.

16. The non-transitory computer readable recording medium according to claim 12, wherein the processor:
- accepts destination indicating whether the output target document is to be output as a print job or as a facsimile job, and
- if the output target document is to be output as the facsimile job, the processor generates the job substantive information and the job data by adding the job substantive information to the job prototype data, the job substantive information designating the image data as the output target in the page description language.

17. The document server according to claim 10, wherein the processor:
- reads the driver program from the storage and executes the driver program if the driver program compatible with the MFP is installed in the storage and the dummy image data is generated, and
- conducts a search on a network connected to the document server to acquire the driver program if the driver program is not installed in the storage and the dummy image data is generated.

18. The image output system according to claim 1, wherein the document server transmits to the information processing terminal the list of user documents based on login information provided by a user using the information processing terminal.

19. An image output method according to claim 6, wherein the method further comprising transmitting by the document server, to the information processing terminal the list of user documents based on login information provided by a user using the information processing terminal.

20. The document server according to claim 7, wherein the user documents being associated with login information provided by a user using an information processing terminal that is operatively connected to the document server.

21. The non-transitory computer readable recording medium according to claim 12, wherein the user documents being associated with login information provided by a user using an information processing terminal that is operatively connected to the document server.

* * * * *